(No Model.) 2 Sheets—Sheet 1.

J. T. WALTON.
CORN PLANTER.

No. 544,906. Patented Aug. 20, 1895.

WITNESSES:
J. Sprigg Poole
Walter Allen

INVENTOR
John T. Walton
BY
Herbert W. T. Jenner.
ATTORNEY.

(No Model.) 2 Sheets—Sheet 2.

J. T. WALTON.
CORN PLANTER.

No. 544,906. Patented Aug. 20, 1895.

WITNESSES:
J. Spragg Poole
Walter Allen

INVENTOR
John T. Walton
BY Herbert W. T. Jenner
ATTORNEY.

UNITED STATES PATENT OFFICE.

JOHN T. WALTON, OF WALKER, MISSOURI.

CORN-PLANTER.

SPECIFICATION forming part of Letters Patent No. 544,906, dated August 20, 1895.

Application filed December 8, 1894. Serial No. 531,225. (No model.)

*To all whom it may concern:*

Be it known that I, JOHN T. WALTON, a citizen of the United States, residing at Walker, in the county of Vernon and State of Missouri, have invented certain new and useful Improvements in Corn-Planters; and I do hereby declare the following to be a full, clear, and exact description of the invention, such as will enable others skilled in the art to which it appertains to make and use the same.

This invention relates to corn-planters; and it consists in a device, as hereinafter fully described and claimed, which may be attached to any cultivator of approved construction and be used to replant corn while cultivating it, without stopping the cultivator, in those places where the corn originally planted has failed to grow in a satisfactory manner.

Figure 1:
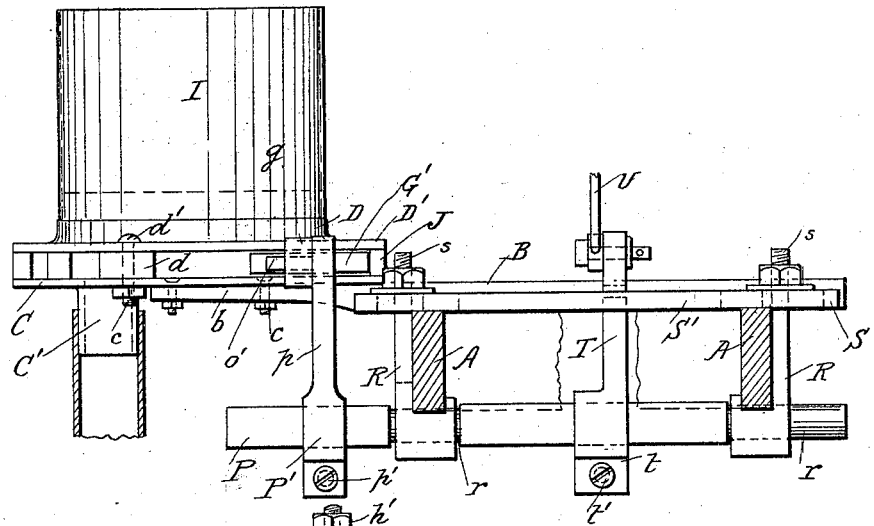
Figure 2:
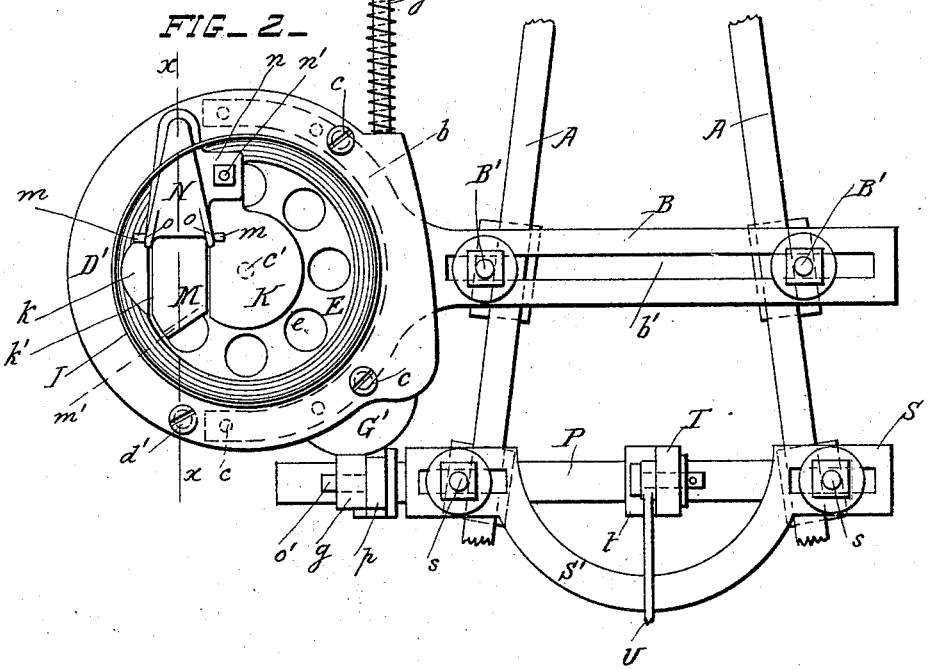
Figure 3:
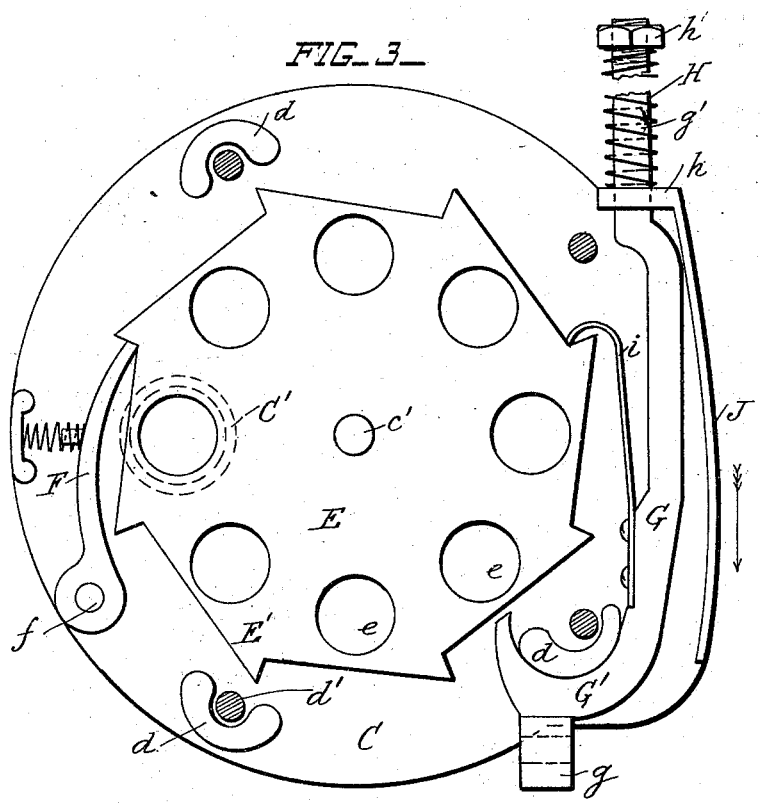
Figure 4:
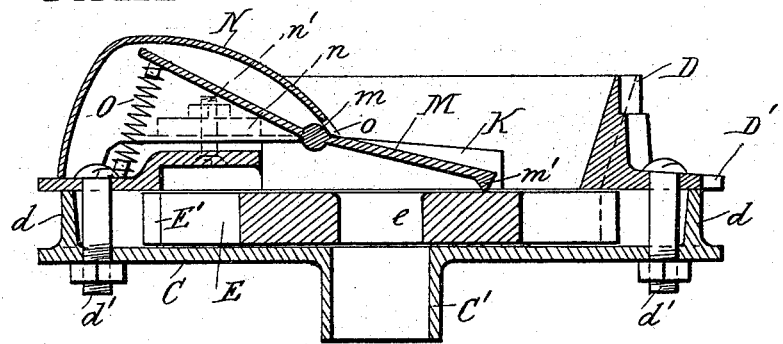

In the drawings, Figure 1 is a front view of the planting device. Fig. 2 is a plan view of the same. Fig. 3 is a detail plan view of the dropping-plate and its actuating mechanism. Fig. 4 is a section taken on the line $xx$ in Fig. 2.

A are portions of the beams of any approved form of a double-shovel cultivator.

B is a supporting-bar provided with a forked end $b$ and a long slot $b'$. The bar B is laid crosswise upon the beams A, and B' are hooked bolts engaging with the under sides of the beams, passing through the said slot, and provided with nuts for securing the bar in position after it has been adjusted laterally.

C is a base-plate secured to the forked end of the arm B by means of the bolts $c$, and provided with the projecting nozzle C' on its under side, and the pin $c'$ projecting centrally from its top. The plate C is also provided with distance-pieces $d$, which project from its top and are preferably arranged close to the holes of the bolts $d'$ which secure the ring D in position. The ring D is provided with a flange D', which rests on the tops of the distance-pieces $d$, and is secured to the plate C by the bolts $d'$.

E is the dropping plate or disk journaled on the pin $c'$, and provided with holes $e$ for receiving the corn and dropping it down the nozzle C'. The dropping-plate E is provided with ratchet-teeth E' on its periphery, and F is a spring-actuated stop-pawl pivoted to the plate C by the pin $f$ and engaging with the teeth of the ratchet-wheel or dropping-plate E. A pipe of india-rubber, or any other approved form of spout, is attached to the nozzle C' and conveys the corn to the ground.

G is a sliding bar provided at one end with the hook-shaped projection G', which hooks over one of the distance-pieces $d$ and is thereby guided and prevented from being moved too far forward. A lug $g$ is formed on the projection G', and the other end $g'$ of the bar G is preferably round. The round end $g'$ of the bar G slides in a lug $h$, projecting from the plate C, and H is a spiral spring interposed between the lug $h$ and a nut or collar $h'$ on the end $g'$, for drawing forward the bar G. A spring-hook $i$ is secured to the middle portion of the bar G and engages with the ratchet-teeth of the dropping-plate.

J is a guard on the plate C on one side of the bar G.

I is a receptacle or hopper for the seed secured to the ring D.

The ring D has a small central plate K for retaining the dropping-plate on its pin. This plate is secured at one end to this ring, and a rib $k$ is formed on the ring to one side of the said plate.

M is a wiper-plate or cut-off provided with pivots $m$, which rest in grooves in the plate K and rib $k$. The wiper-plate is arranged in the space $k'$ between the said plate and rib, and it has a projection $m'$ on its front end which bears downward on the dropping-plate.

N is a hollow cap secured to the plate K by the lug $n$ and bolt $n'$. The front end of the cap has lugs $o$ which bear on the pivots $m$ and retain them in position.

O is a spring interposed between the ring D and the rear end of the plate M, inside the hollow cap, and operating to press the front end of the wiper-plate onto the dropping-plate.

P is a shaft which is preferably square, and $p$ is an arm provided with a split boss P' and a screw or bolt $p'$ for clamping it on the shaft P after its position has been adjusted. The upper end of the arm $p$ is pivoted to the lug $g$ of the sliding bar G by the pin $o'$. The shaft P has circular portions $r$, which are journaled in bearings in the lower ends of the hooked bolts R.

S is a clamping-plate which rests on the beams A. The upper end of the hooked bolts R pass through holes in the plate S, and are secured by bolts s.

T is an arm provided with a split boss t and a screw or bolt t' for clamping it on the square portion of the shaft P, between the beams, after its lateral position has been adjusted. The middle portion S' of the plate S is curved so as to clear the upper end of the arm T.

U is the operating-rod pivoted to the arm T. This rod may be provided with a trip lever (not shown) adapted to be pivoted to the handle-bar of the cultivator, or it may be otherwise arranged in any approved manner so as to be operated conveniently by the man using the cultivator.

When the operating-rod is moved to turn the arms T and p and draw back the slide in the direction of the arrow in Fig. 3, the dropping-plate is partially rotated and the corn in one of the holes is dropped down the nozzle. The wiper-plate clears away any grains of corn which partially project from the holes in the dropping-plate, and the spring H draws forward the slide and enables the spring-hook to engage with another ratchet-tooth as soon as the rod U is released.

I do not confine the use of my device to planting corn, as any other seed, such as cotton or beans, may be planted by it, or it may be used to drop fertilizer on the ground.

The seed is covered over by the blades of the cultivator after being dropped by the planter.

What I claim is—

1. In a corn planter adapted to be attached to a cultivator, the combination, with devices for dropping the corn operated by a slide; of an adjustable supporting arm provided with a long slot and resting on the cultivator beams, and hooked bolts for securing the said arm in position; a shaft and adjustable arms T and p, the arm p being pivoted to the said slide; a plate provided with a curved portion for clearing the arm T and resting on the cultivator beams; hooked bolts forming bearings for the said shaft and engaging with the said plate and beams; and an operating rod pivoted to the arm T, substantially as set forth.

2. In a corn planter, the combination, with the base plate provided with distance pieces and a nozzle, a ring having a flange secured over the said distance pieces, and the seed hopper above the ring; of the dropping plate provided with seed holes and ratchet teeth and journaled between the said base plate and flange; a spring-actuated stop pawl; a slidable bar provided at its rear end with a lug for the attachment of its operating mechanism, at its front end with a round portion g' slidable in a lug on the base plate and provided with a nut, and at its middle with a spring hook engaging with the said ratchet teeth; and a spiral spring interposed between the said nut and lug and operating to move the said bar in one direction, substantially as set forth.

3. In a corn planter, the combination, with the base plate provided with a central pin, the distance pieces d, the nozzle C', the lug h, and the guard J; of the dropping plate provided with seed holes and ratchet teeth and journaled on the said pin; a spring-actuated stop pawl; and a slidable bar having a hooked portion G' at one end engaging with one of the distance pieces and operating to guide the rear end of the said bar and prevent it from being slid too far forward, a round portion at the other end sliding in the said lug and provided with a nut on its end, a spring interposed between the said lug and nut, and a spring hook secured to the middle portion of the bar and engaging with the ratchet teeth, substantially as set forth.

In testimony whereof I affix my signature in presence of two witnesses.

JOHN T. WALTON.

Witnesses:
M. D. JONES,
W. B. LOWRY.